United States Patent
Maeda et al.

(10) Patent No.: US 10,711,189 B2
(45) Date of Patent: Jul. 14, 2020

(54) LIGHT SOURCE UNIT AND PROJECTION DISPLAY APPARATUS

(71) Applicant: SONY CORPORATION, Tokyo (JP)

(72) Inventors: Yuki Maeda, Kanagawa (JP); Hiroki Morita, Kanagawa (JP); Izushi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/332,326

(22) PCT Filed: Jul. 27, 2017

(86) PCT No.: PCT/JP2017/027242
§ 371 (c)(1),
(2) Date: Mar. 11, 2019

(87) PCT Pub. No.: WO2018/055903
PCT Pub. Date: Mar. 29, 2018

(65) Prior Publication Data
US 2019/0211263 A1 Jul. 11, 2019

(30) Foreign Application Priority Data
Sep. 20, 2016 (JP) ................. 2016-182740

(51) Int. Cl.
*C09K 11/70* (2006.01)
*C09K 11/02* (2006.01)
*G03B 21/20* (2006.01)
*F21S 2/00* (2016.01)
*F21V 9/08* (2018.01)
*G03B 21/14* (2006.01)
*C09K 11/08* (2006.01)

(52) U.S. Cl.
CPC .............. *C09K 11/70* (2013.01); *C09K 11/02* (2013.01); *C09K 11/08* (2013.01); *F21S 2/00* (2013.01); *F21V 9/08* (2013.01); *G03B 21/14* (2013.01); *G03B 21/204* (2013.01)

(58) Field of Classification Search
CPC ...... G03B 21/204; C09K 11/70; C09K 11/02; F21S 2/00; F21V 9/08
USPC ........................................................ 353/84
See application file for complete search history.

(56) References Cited

U.S. PATENT DOCUMENTS

2012/0087124 A1* 4/2012 Ravillisetty ............ C09K 11/02
362/235
2012/0200218 A1 8/2012 Maemura et al.
(Continued)

FOREIGN PATENT DOCUMENTS

JP 2012-162600 8/2012
JP 2012-185402 9/2012
(Continued)

OTHER PUBLICATIONS

Machine Translation of JP 2015032599 (Year: 2019).*
(Continued)

*Primary Examiner* — Jerry L Brooks
(74) *Attorney, Agent, or Firm* — Sheridan Ross P.C.

(57) ABSTRACT

A light source unit includes a light source section and a fluorescent structure. The fluorescent structure includes a fluorescent part where light from the light source section enters. The fluorescent part includes a transparent grain in addition to a plurality of phosphors.

17 Claims, 13 Drawing Sheets

(56) References Cited

U.S. PATENT DOCUMENTS

2015/0276177 A1 10/2015 Maeda et al.
2016/0377967 A1 12/2016 Ando et al.

FOREIGN PATENT DOCUMENTS

| JP | 2013120713 | * | 6/2013 | ................ F21S 2/00 |
| JP | 2015032599 | * | 7/2013 | ............. H01L 33/50 |
| JP | 2013-216800 | | 10/2013 | |
| JP | 2014-507755 | | 3/2014 | |
| JP | 2014229503 | * | 8/2014 | ................ F21S 2/00 |
| JP | 2014-229503 | | 12/2014 | |
| JP | 2015-001709 | | 1/2015 | |
| JP | 2017027685 | * | 7/2015 | ................ F21V 9/10 |
| JP | 2015-143824 | | 8/2015 | |
| JP | 2015-197474 | | 11/2015 | |

OTHER PUBLICATIONS

Machine Translation of JP 2017027685 (Year: 2019).*
Machine Translation of JP2013120713 (Year: 2019).*
Machine Translation of JP2014229503 (Year: 2019).*
International Search Report prepared by the Japan Patent Office dated Oct. 3, 2017, for International Application No. PCT/JP2017/027242.

* cited by examiner

[ FIG. 1 ]
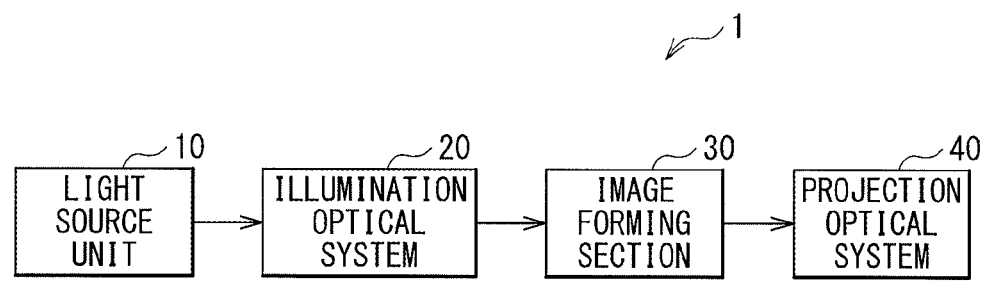

[FIG. 2]
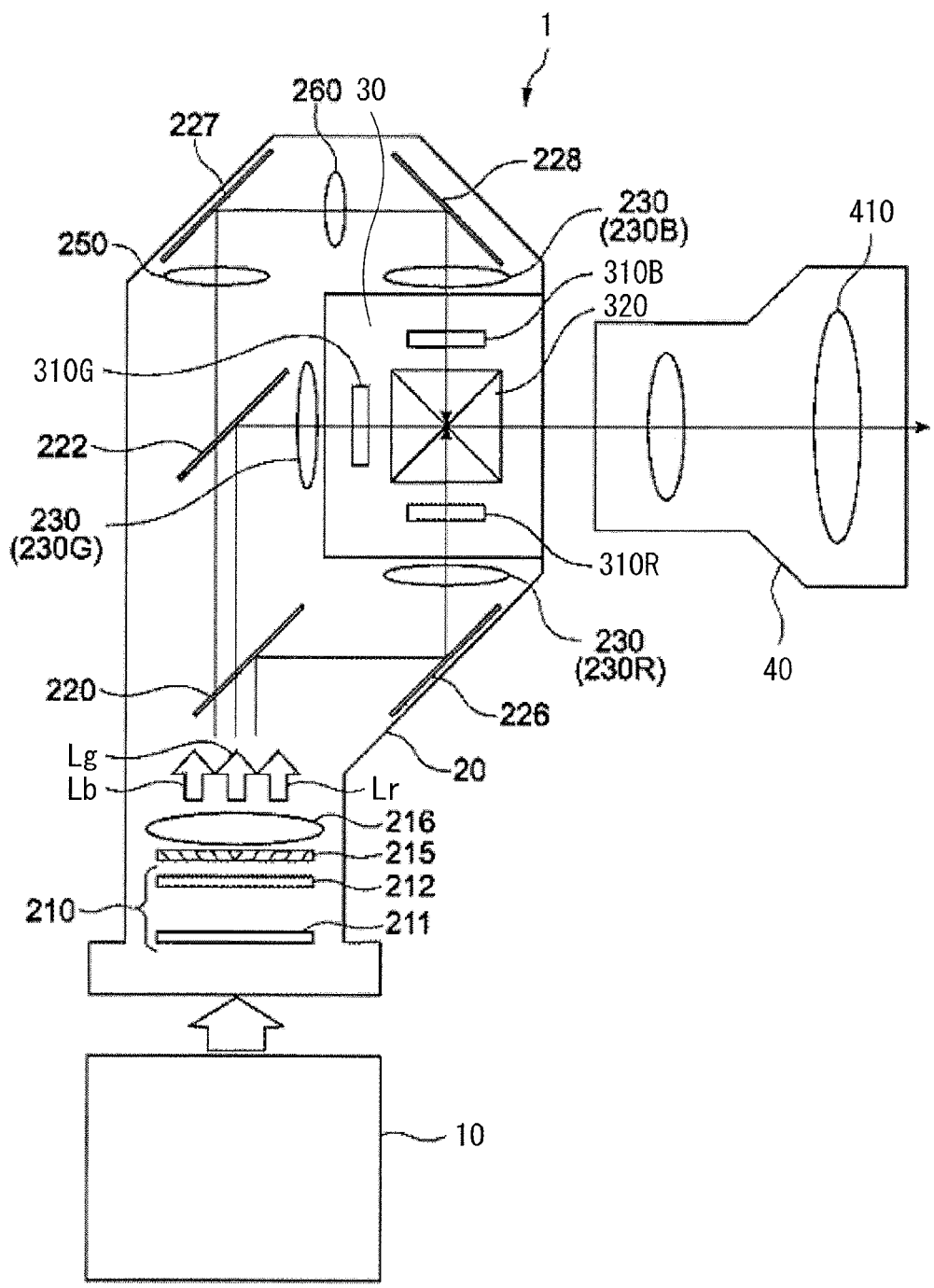

[ FIG. 3 ]
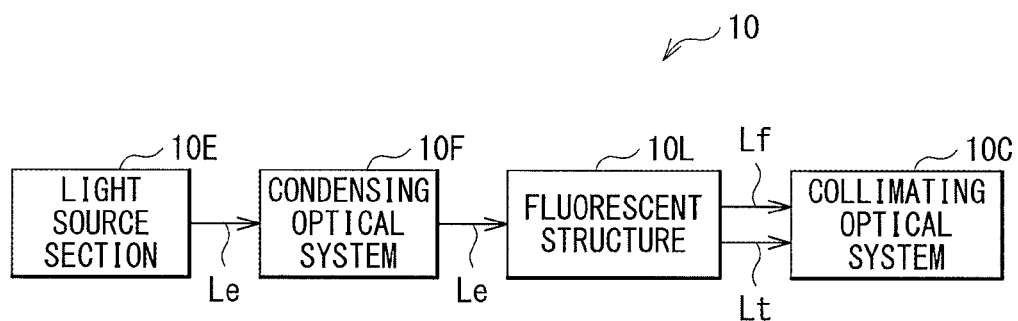

[FIG. 4]
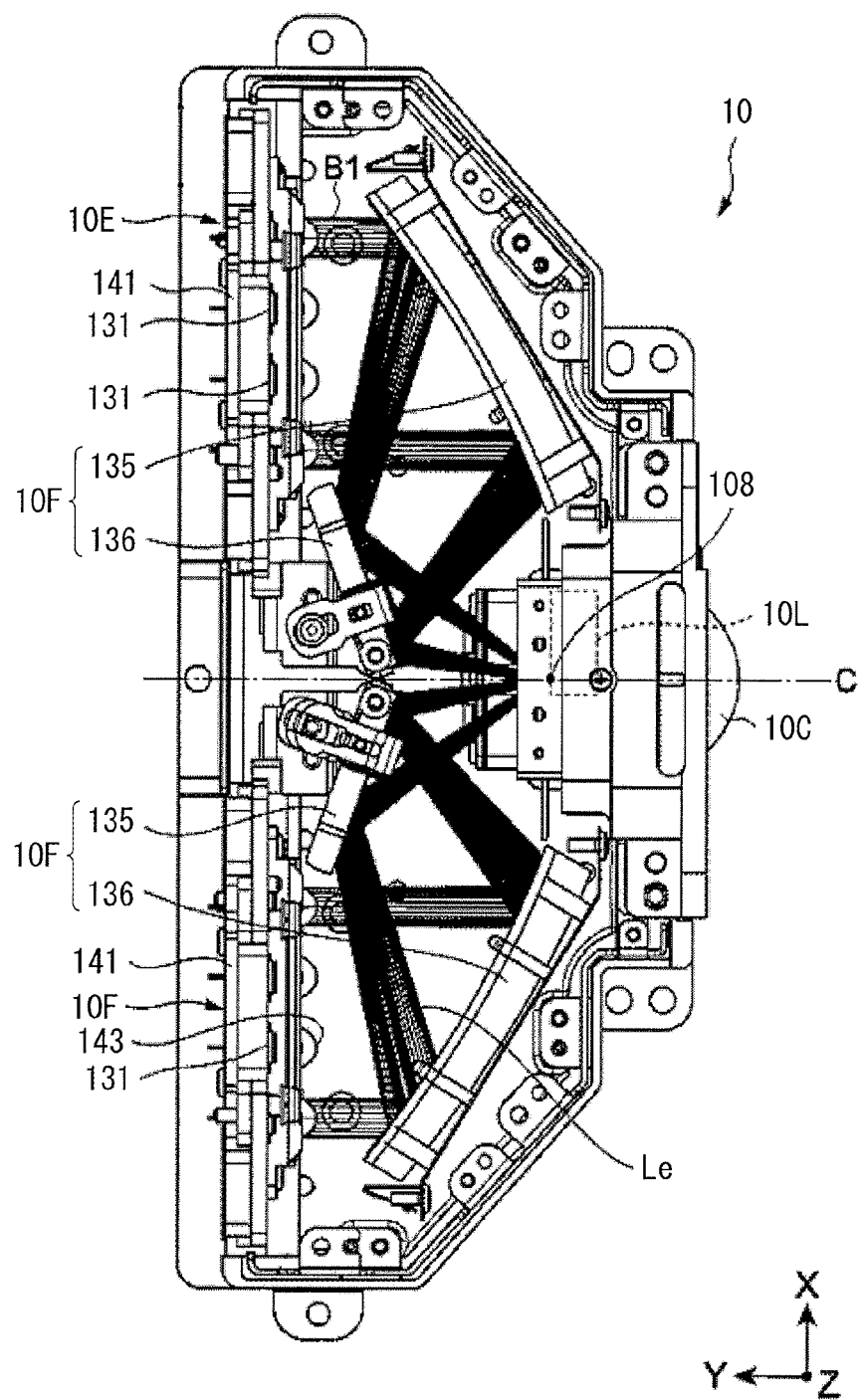

[FIG. 5]
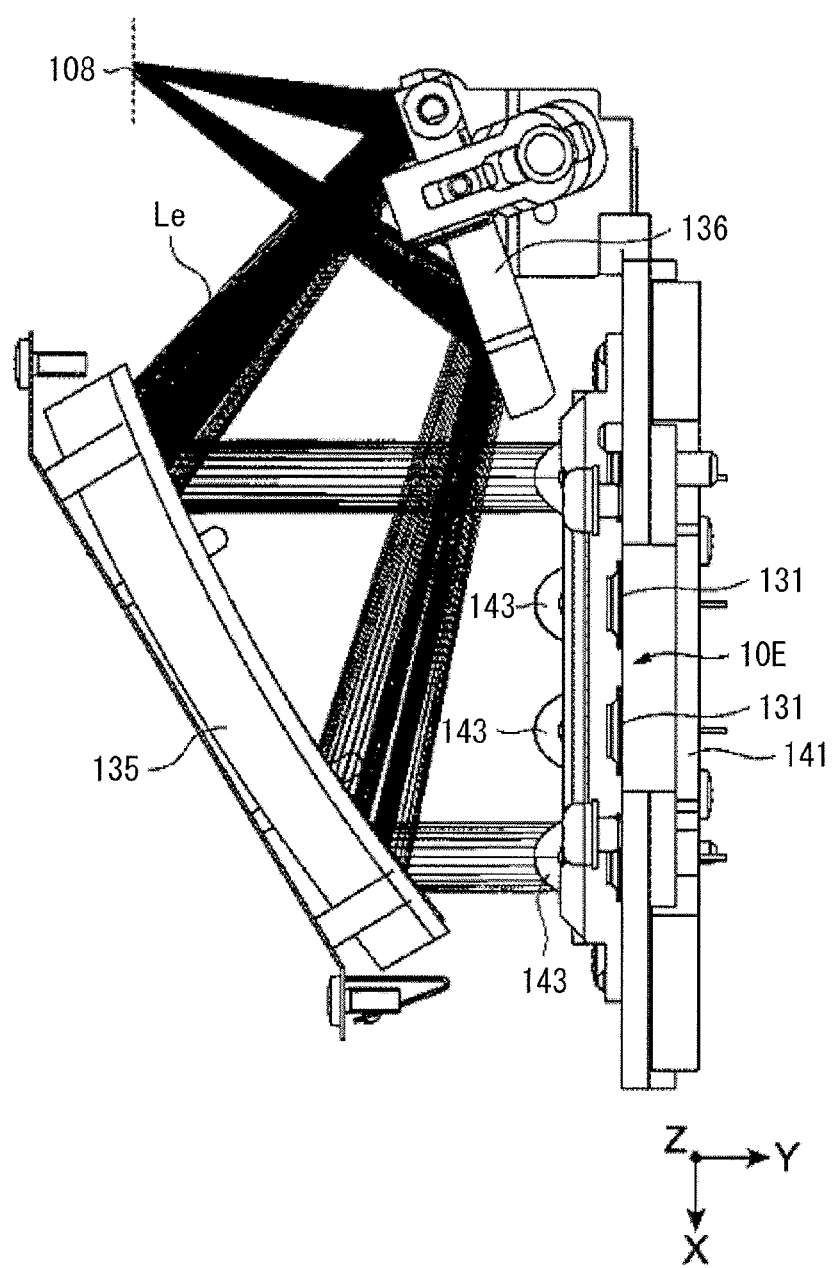

[ FIG. 6A ]
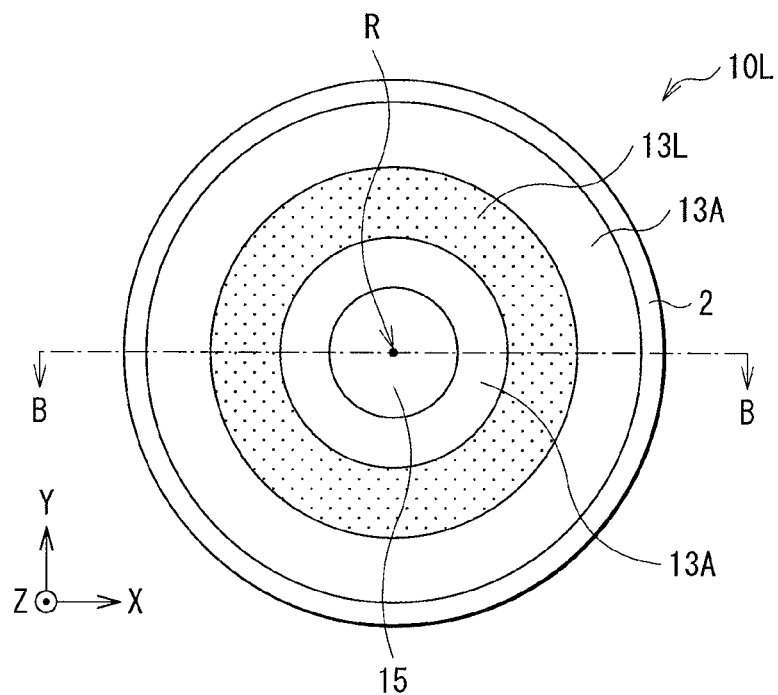
[ FIG. 6B ]
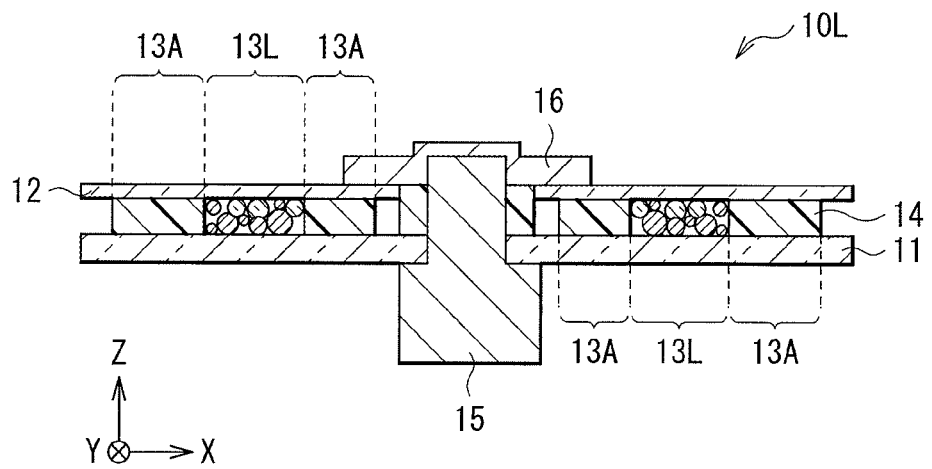

[ FIG. 7 ]
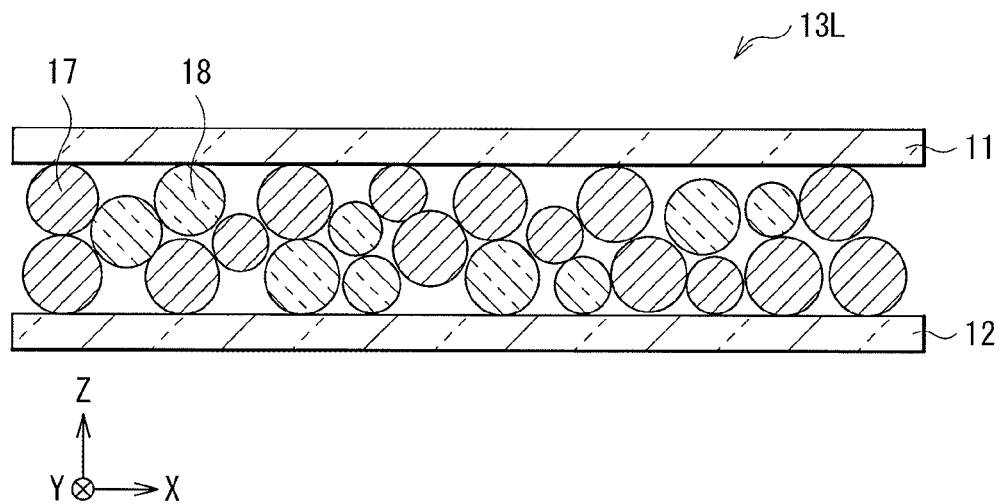
[ FIG. 8 ]
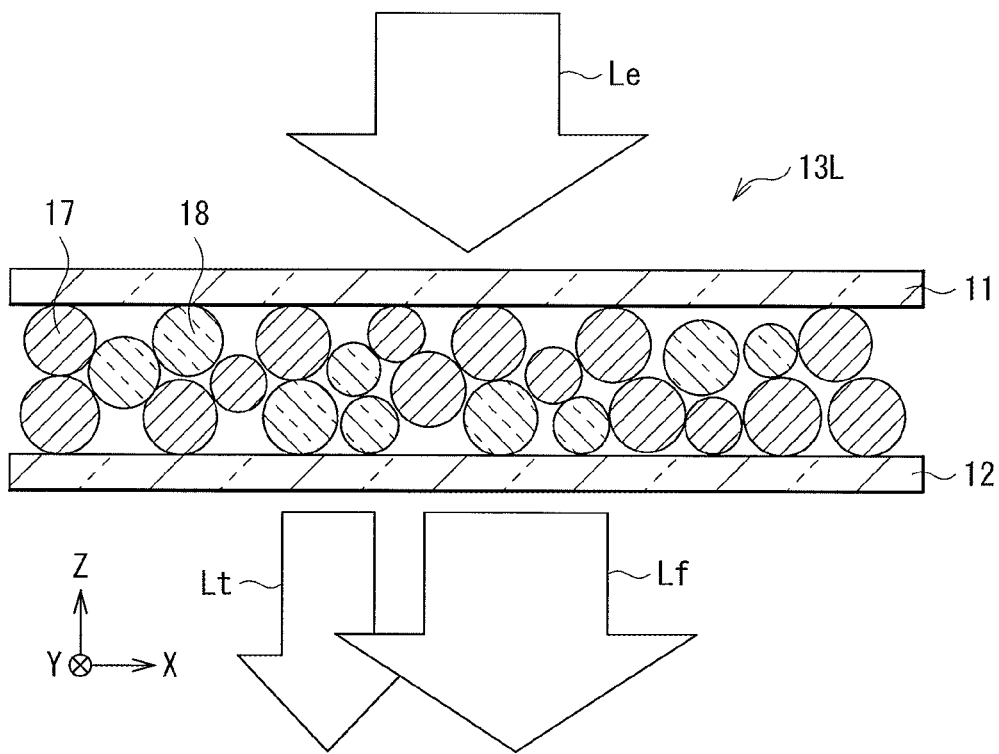

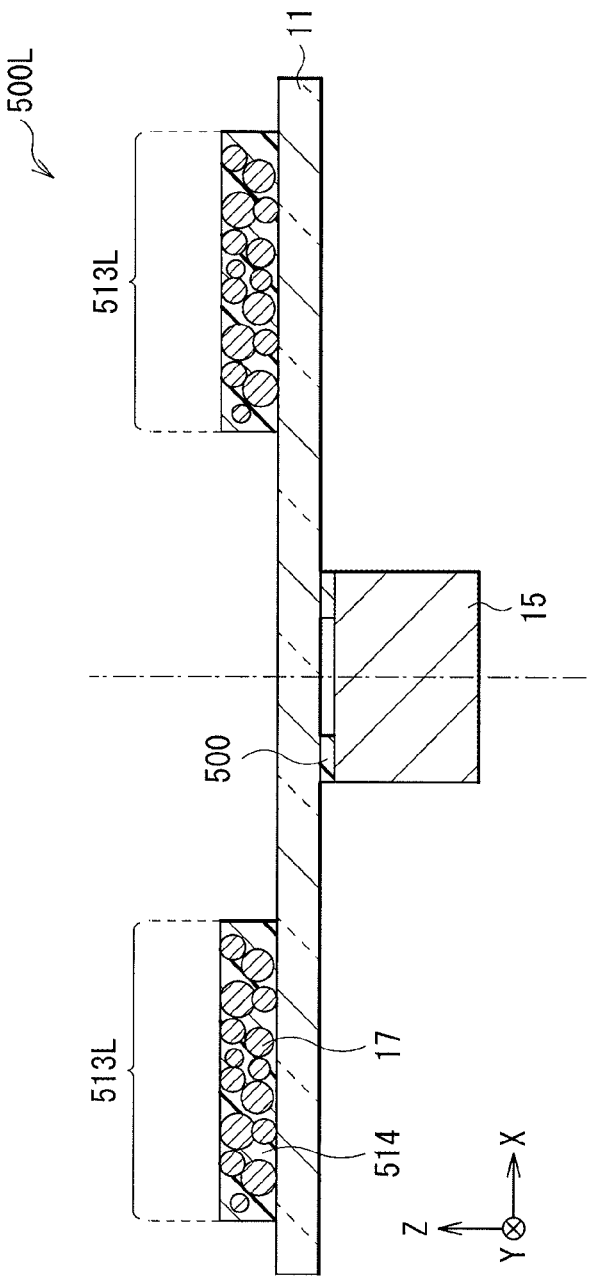

[ FIG. 10 ]
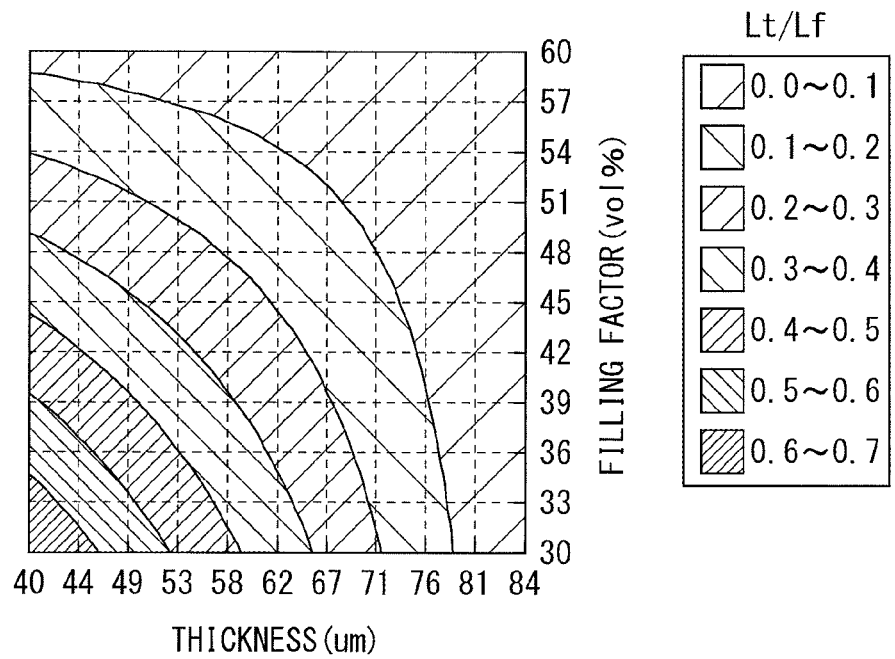
[ FIG. 11 ]
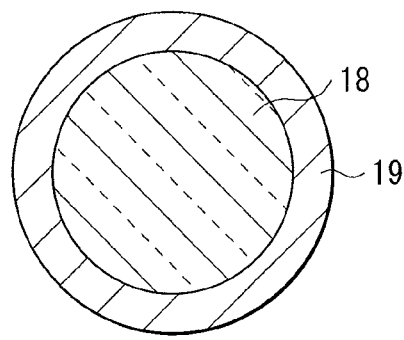
[ FIG. 12 ]
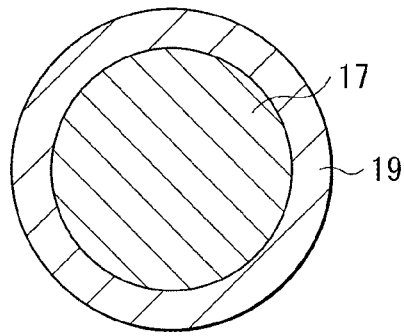

[ FIG. 13 ]
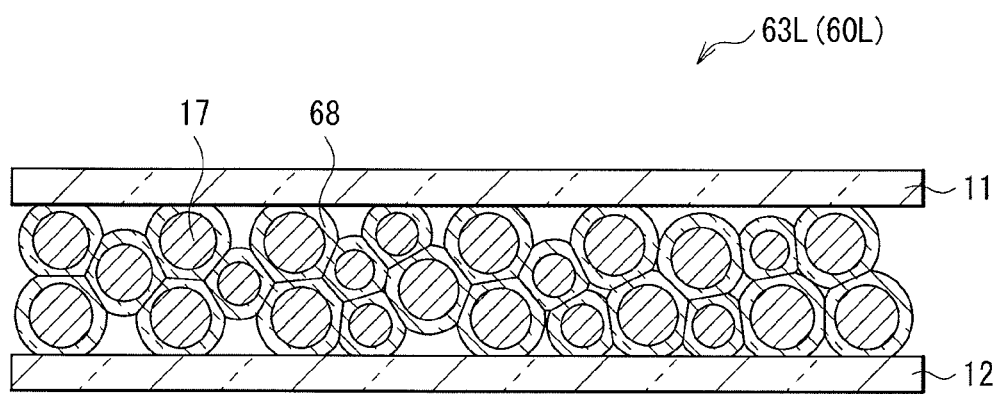
[ FIG. 14 ]
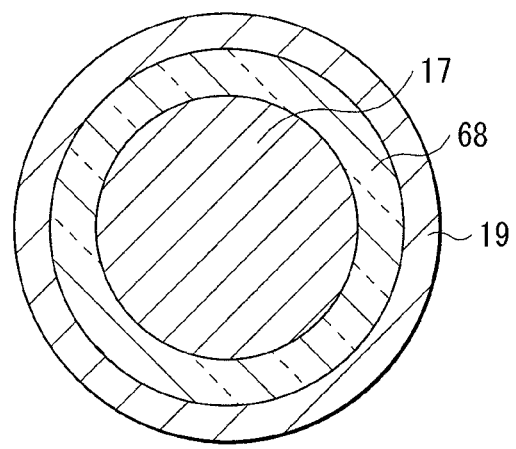

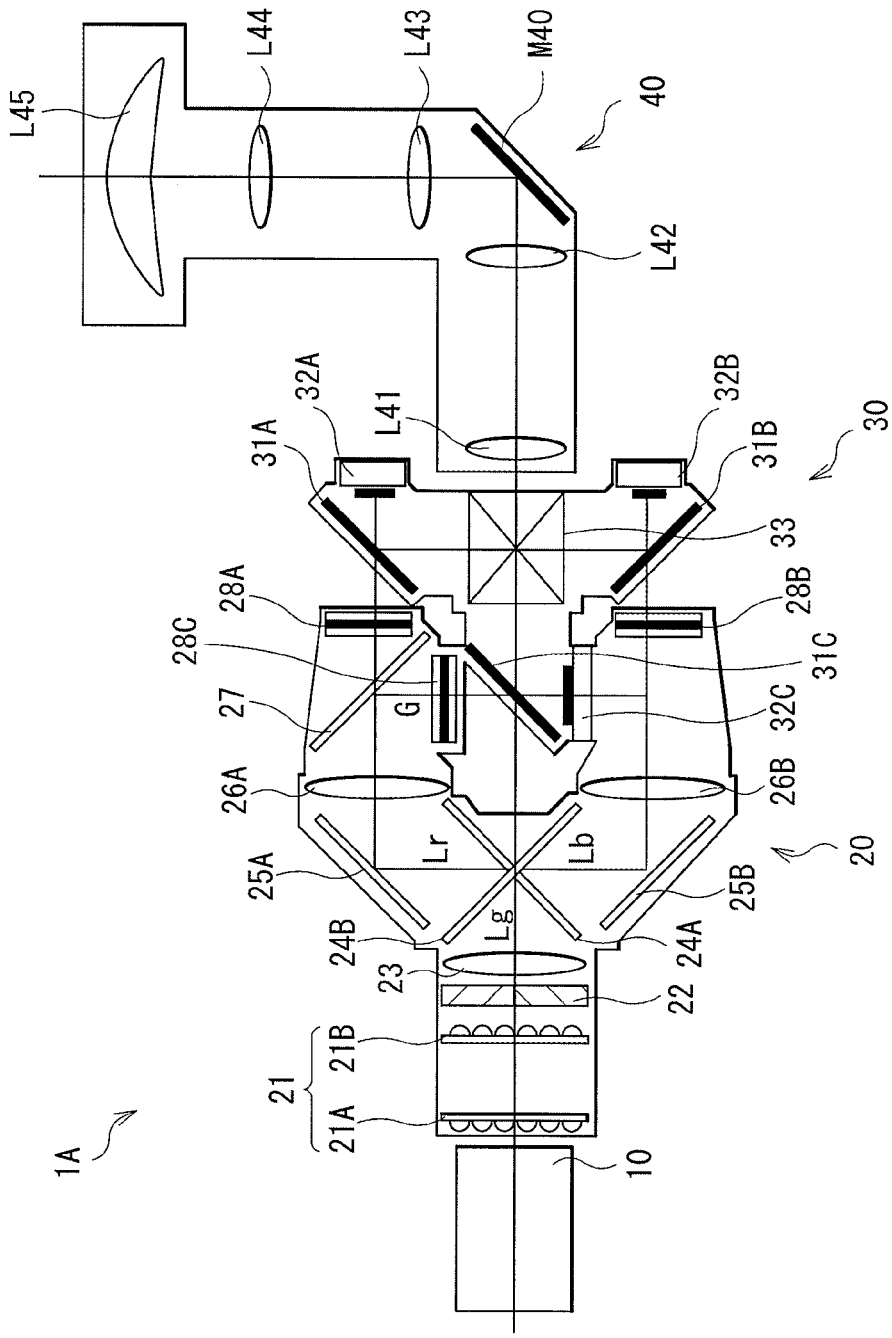
[FIG. 15]

[ FIG. 16 ]
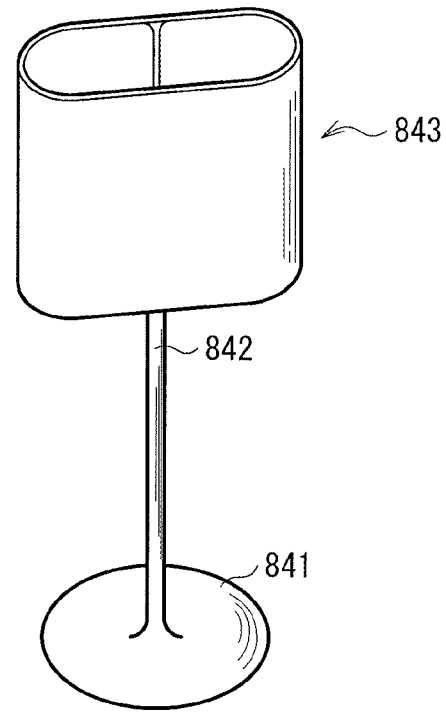
[ FIG. 17 ]
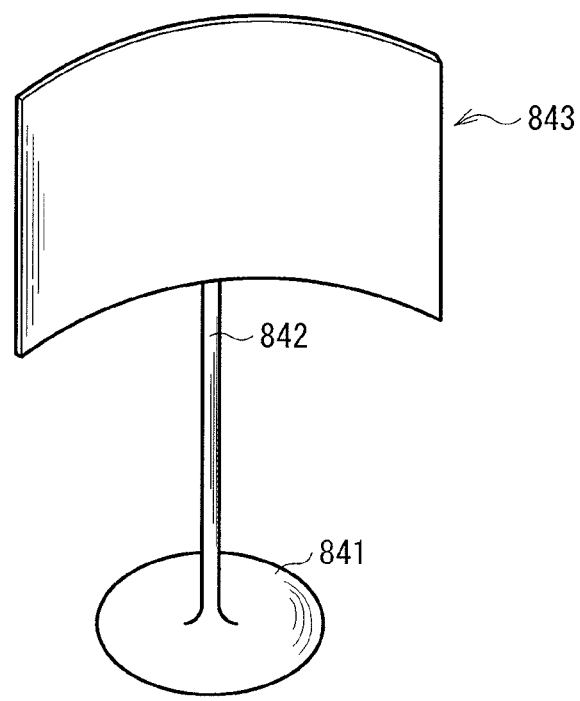

[ FIG. 18 ]
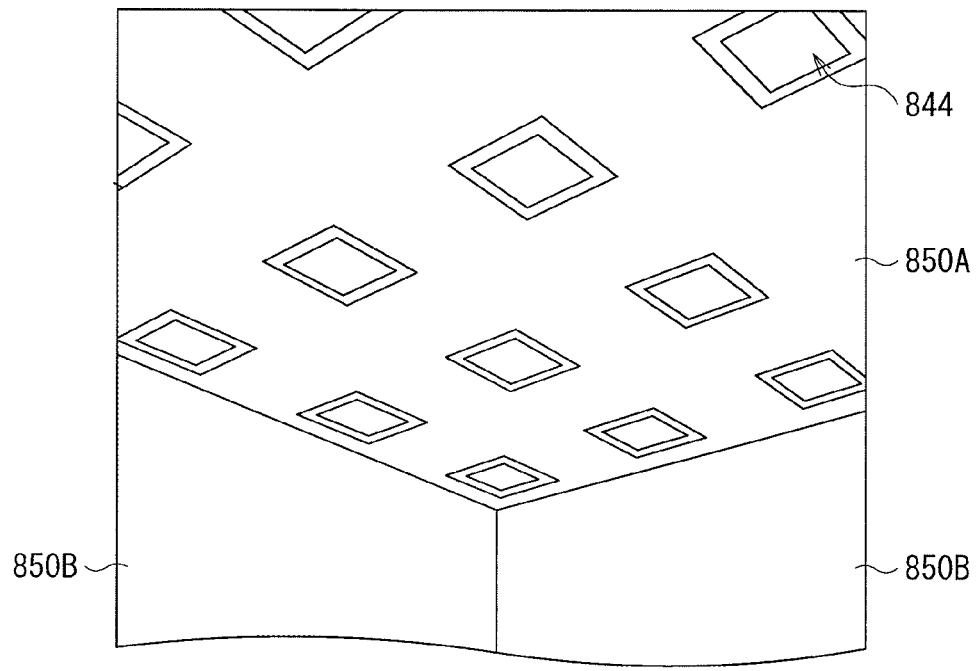

LIGHT SOURCE UNIT AND PROJECTION DISPLAY APPARATUS

CROSS REFERENCE TO RELATED APPLICATIONS

This application is a national stage application under 35 U.S.C. 371 and claims the benefit of PCT Application No. PCT/JP2017/027242 having an international filing date of 27 Jul. 2017, which designated the United States, which PCT application claimed the benefit of Japanese Patent Application No. 2016-182740 filed 20 Sep. 2016, the entire disclosures of each of which are incorporated herein by reference.

TECHNICAL FIELD

The present technology relates to a light source unit including, for example, a fluorescent structure such as a phosphor wheel, and to a projection display apparatus including the light source unit.

BACKGROUND ART

In recent years, a light source unit including a fluorescent structure such as a phosphor wheel has been used for a projection display apparatus (projector) (see PTL 1, for example). The phosphor wheel includes a plurality of phosphors on a substrate, for example, and the plurality of phosphors are fixed to the substrate by a binder. A portion of excitation light having entered the fluorescent structure is absorbed by the phosphors and is converted into fluorescence, whereas a remaining portion of the excitation light passes through the fluorescent structure without undergoing the conversion (transmitted light).

CITATION LIST

Patent Literature

PTL 1: Japanese Unexamined Patent Application Publication No. 2013-216800

SUMMARY OF THE INVENTION

In such a fluorescent structure, it is desired to perform color adjustment by controlling a ratio between fluorescence and transmitted light.

It is therefore desirable to provide a light source unit and a projection display apparatus that make it possible to adjust a ratio between fluorescence and transmitted light.

A light source unit (1) according to an embodiment of the present technology includes a light source section and a fluorescent structure. The fluorescent structure includes a fluorescent part where light from the light source section enters. The fluorescent part includes a plurality of phosphors each having a surface that is covered with a transparent coating layer.

A projection display apparatus (1) according to an embodiment of the present technology includes the light source unit (1) according to an embodiment of the present technology.

In the light source unit (1) and the projection display apparatus (1) according to respective embodiments of the present technology, the surface of each of the phosphors is covered with the transparent coating layer, and thus a thickness of the transparent coating layer allows for adjustment of a distance between adjacent phosphors.

A light source unit (2) according to an embodiment of the present technology includes a light source section and a fluorescent structure. The fluorescent structure includes a fluorescent part where light from the light source section enters. The fluorescent part includes a transparent grain in addition to a plurality of phosphors.

A projection display apparatus (2) according to an embodiment of the present technology includes the light source unit (2) according to an embodiment of the present technology.

In the light source unit (2) and the projection display apparatus (2) according to respective embodiments of the present technology, the fluorescent part is provided with the transparent grain, and thus the grain diameter, the number, etc. of the transparent grain allows for adjustment of a distance between adjacent phosphors.

According to the light source units (1) and (2) and the projection display apparatuses (1) and (2) according to respective embodiments of the present technology, the transparent coating layer or the transparent grain makes it possible to adjust a volume of the phosphors per unit volume as well as a layer thickness. Hence, it becomes possible to freely adjust the ratio between the fluorescence and the transmitted light. It is to be noted that the effects described here are not necessarily limitative, and may be any of the effects described in the present disclosure.

BRIEF DESCRIPTION OF DRAWINGS

FIG. 1 is a block diagram illustrating an overall configuration of a projection display apparatus according to an embodiment of the present technology.

FIG. 2 is a schematic view of a specific example of the projection display apparatus illustrated in FIG. 1.

FIG. 3 is a block diagram illustrating a configuration of a light source unit illustrated in FIG. 1.

FIG. 4 is a top view of a specific example of a light source unit illustrated in FIG. 3.

FIG. 5 is an enlarged view of a light source section and a condensing optical system illustrated in FIG. 4.

FIG. 6A is a plan view of a configuration of a fluorescent structure illustrated in FIG. 3.

FIG. 6B is a cross-sectional view taken along a line B-B' indicated in FIG. 6A.

FIG. 7 is an enlarged view of a fluorescent part illustrated in FIG. 6B.

FIG. 8 is an explanatory cross-sectional view of an operation of the fluorescent structure.

FIG. 9 is a cross-sectional view of a configuration of a fluorescent structure according to a comparative example.

FIG. 10 illustrates a variation in ratio between fluorescence and transmitted light in the fluorescent structure illustrated in figures such as FIG. 6A.

FIG. 11 is a cross-sectional view of a configuration of a transparent grain according to Modification Example 1.

FIG. 12 is a cross-sectional view of a configuration of a phosphor according to Modification Example 1.

FIG. 13 is a cross-sectional view of a configuration of a fluorescent structure according to a second embodiment.

FIG. 14 is a cross-sectional view of a configuration of a phosphor according to Modification Example 2.

FIG. 15 is a schematic view of an overall configuration of a projection display apparatus according to Modification Example 3.

FIG. 16 is a perspective view of an example of an appearance of a lighting apparatus to which the light source unit illustrated in FIG. 3 is applied.

FIG. 17 is a perspective view of another example (1) of the lighting apparatus illustrated in FIG. 16.

FIG. 18 is a perspective view of another example (2) of the lighting apparatus illustrated in FIG. 16.

MODES FOR CARRYING OUT THE INVENTION

In the following, embodiments of the present technology are described in detail with reference to the drawings. It is to be noted that description is given in the following order.

1. First Embodiment

An example in which a fluorescent part includes a transparent grain

2. Modification Example 1

An example in which a phosphor or a transparent grain is coated with an optically functional layer 3. Second Embodiment An example in which a phosphor is covered with a transparent coating layer 4. Modification Example 2

An example in which a transparent coating layer is further coated with an optically functional layer 5. Modification Example 3

Another example of a configuration of a projection display apparatus

First Embodiment (Overall Configuration)

FIG. 1 is a block diagram illustrating an overall configuration of a projection display apparatus (a projection display apparatus 1) according to a first embodiment of the present technology. FIG. 2 is a schematic view of an example of a configuration of the projection display apparatus 1. The projection display apparatus 1 is a display apparatus that projects an image onto a screen, for example. The projection display apparatus 1 is coupled, for example, to a computer such as a PC, or to an external image supply apparatus such as various image players via an interface (I/F), and performs projection onto a screen, etc. on the basis of an image signal to be inputted to the I/F. It is to be noted that a configuration of the projection display apparatus 1 described hereinafter is merely exemplary; the projection display apparatus of the present technology is not limited to such a configuration.

The projection display apparatus 1 includes a light source unit 10, an illumination optical system 20, an image forming section 30, and a projection optical system 40.

FIG. 3 is a block diagram illustrating an example of a configuration of the light source unit 10. The light source unit 10 emits white light, for example, and includes a light source section 10E, a condensing optical system 10F, a fluorescent structure 10L, and a collimating optical system 10C.

FIG. 4 illustrates an example of a configuration of a top face of the light source unit 10. FIG. 5 is an enlarged view of the light source section 10E and the condensing optical system 10F illustrated in FIG. 4. The light source section 10E includes a laser light source 131, a mounting substrate 141, and a collimator lens 143. The laser light source is, for example, a semiconductor laser element that emits excitation light Le in a blue wavelength region (e.g., a wavelength of 400 nm to 470 nm). The light source section 10E includes, for example, a plurality of laser light sources 131. The light source section 10E may include one laser light source 131. The light source section 10E may include, instead of the laser light source 131, another solid-state light source such as a light-emitting diode (LED) and a laser excitation phosphor; a lamp light source may also be provided. The mounting substrate 141 is used to mount the plurality of laser light sources 131. The collimator lens 143 is a rotationally symmetrical aspherical lens, and is provided at a position corresponding to each of the laser light sources 131. The collimator lens 143 serves to cause the excitation light Le emitted from the laser light source 131 to be a substantially parallel light flux.

The condensing optical system 10F serves to condense each excitation light Le emitted from each of the plurality of laser light sources 131 to a predetermined condensed area 108. The condensing optical system 10F includes, for example, an aspherical mirror 135 and a planar mirror 136. The aspherical mirror 135 serves to reflect the excitation light Le emitted from each of the plurality of laser light sources 131 to condense the reflected excitation light Le onto the planar mirror 136. The planar mirror 136 reflects the excitation light Le reflected by the aspherical mirror 135 to guide the reflected excitation light Le toward the condensed area 108. The condensed area 108 is disposed at a fluorescent part (a fluorescent part 13L illustrated in FIGS. 6A and 6B described later) of the fluorescent structure 10L.

The fluorescent structure 10L is a phosphor wheel that absorbs a portion of the excitation light Le in a blue wavelength region having entered the fluorescent structure 10L and generates fluorescence Lf in a yellow wavelength region (between a red wavelength region and a green wavelength region), for example. The fluorescence Lf and light (transmitted light Lt) that is transmitted as it is without being absorbed by the fluorescent structure 10L are combined to form white light. The combined light (white light) enters the illumination optical system 20 via the collimating optical system 10C. A specific configuration of the fluorescent structure 10L is described later. The collimating optical system 10C is configured, for example, by a collimator lens. The collimating optical system 10C substantially collimates light (the fluorescence Lf and the transmitted light Lt) outputted from the fluorescent structure 10L.

As illustrated in FIG. 2, the illumination optical system 20 includes, for example, an integrator element 210, a polarization conversion element 215, a condensing lens 216, color separation elements 220 and 222, optical path conversion elements 226, 227, and 228, relay lenses 250 and 260, and field lenses 230 (230R, 230G, and 230B).

The integrator element 210 has a function of arranging light emitted from the light source unit 10 to have a uniform luminance distribution; the light having the uniform luminance distribution is applied from the illumination optical system 20 to the image forming section 30. The integrator element 210 includes, for example, a first fly's eye lens 211 and a second fly's eye lens 212. The first fly's eye lens 211 and the second fly's eye lens 212 each include a plurality of microlenses that are two-dimensionally disposed; the respective microlenses of the second fly's eye lens 212 are so disposed as to correspond, on a one-to-one basis, to the respective microlenses of the first fly's eye lens 211. Parallel light emitted from the light source unit 10 enter the first fly's eye lens 211, and is split into a plurality of light fluxes by the microlenses. The plurality of light fluxes are formed into images on corresponding ones of the respective microlenses of the second fly's eye lens 212. Each of the microlenses of the second fly's eye lens 212 functions as a secondary light source, and guides the plurality of parallel light beams to the polarization conversion element 215.

The polarization conversion element 215 has a function of aligning polarization states of light incident from the integrator element 210. Light having passed through the polarization conversion element 215 and the condensing lens 216 include, for example, red light Lr, green light Lg. and blue light Lb.

The color separation elements 220 and 222 each have a property of selectively reflecting a color beam in a predetermined wavelength region and transmitting light in other wavelength regions. For example, the color separation element 220 selectively reflects the red light Lr. The color separation element 222 selectively reflects the green light Lg among the green light Lg and the blue light Lb that are transmitted through the color separation element 220. The blue light Lb is transmitted through the color separation element 222. Such color separation elements 220 and 222 cause the light emitted from the light source unit 10 to be separated into a plurality of color beams having colors that are different from one another.

The red light Lr reflected at the color separation element 220 enters the image forming section 30 (a light modulation element 310R described later) via the optical path conversion element 226 and the field lens 230R. The green light Lg reflected at the color separation element 222 enters the image forming section 30 (a light modulation element 310G described later) via the field lens 230G. The blue light Lb transmitted through the color separation element 222 passes through the relay lens 250, the optical path conversion element 227, the relay lens 260, the optical path conversion element 228, and the field lens 230B in this order to enter the image forming section 30 (a light modulation element 310B described later). The optical path conversion elements 226, 227, and 228 each serve to reflect incident light to change a traveling direction of the light, and are each configured by a mirror, for example. The field lenses 230R, 230G, and 230B each serve to collimate incident light.

The image forming section 30 includes, for example, the light modulation elements 310R, 310G, and 310B as well as a color combining element 320. The light modulation elements 310R, 310G, and 310B are each electrically coupled to an unillustrated signal line (of a PC, etc., for example) that supplies an image signal including image information. The light modulation elements 310R, 310G, and 310B each modulate incident light on a pixel basis on the basis of an image signal of each color to be supplied. This allows for formation of a red image, a green image, and a blue image in the light modulation elements 310R, 310G, and 310B, respectively. The light modulation elements 310R, 310G, and 310B are each configured, for example, by a transmissive liquid crystal panel. The light modulation elements 310R, 310G, and 310B may be each configured by a reflective liquid crystal panel or a micro electro mechanical systems (MEMS) mirror panel. The color combining element 320 serves to combine the red light, the green light, and the blue light (the red image, the green image, and the blue image) modulated, respectively, by the light modulation elements 310R, 310G, and 310B and to guide the combined light to the projection optical system 40. The color combining element 320 is configured, for example, by a dichroic prism.

The projection optical system 40 includes, for example, a plurality of lenses 410. The projection optical system 40 serves to expand light guided from the image forming section 30 (the color combining element 320) to project the expanded light onto, for example, a surface such as a screen, or an object or a space (unillustrated), etc.

(Configuration of Fluorescent Structure 10L)

Description is given hereinafter of a configuration of the fluorescent structure 10L of the light source unit 10.

FIG. 6A illustrates a planar configuration of the fluorescent structure 10L. FIG. 6B is a cross-sectional view taken along a line B-B' indicated in FIG. 6A. The fluorescent structure 10L is a circular rotator, and has a rotation axis R at the center.

As illustrated in FIG. 6B, the fluorescent structure 10L includes a first substrate 11 and a second substrate 12 facing each other, and includes, between the first substrate 11 and the second substrate 12, an adhesive part 13A and the fluorescent part 13L. The adhesive part 13A is a part that includes an adhesive 14, and thus causes the first substrate 11 and the second substrate 12 to be adhered and fixed together. The fluorescent part 13L is a part where the condensed area 108 is disposed, and light from the condensing optical system 10F enters the fluorescent part 13L. The fluorescent structure 10L includes a motor 15 and a fixing member 16 at the center of the circle. Light having entered the fluorescent structure 10L passes through the first substrate 11, the fluorescent part 13L, and the second substrate 12 in this order.

Each of the first substrate 11 and the second substrate 12 is a substrate having a circular planar shape, and has a through-hole at a central part. The motor 15 is provided in the respective through-holes of the first substrate 11 and the second substrate 12. The first substrate 11 is configured, for example, by a sapphire substrate. Glass, an oxide semiconductor such as InGaZnO, or a nitride semiconductor such as AlN may be used as the first substrate 11. Only a part of a light-transmissive region (the fluorescent part 13L) of the first substrate 11 may be configured by sapphire, glass, an oxide semiconductor, or a nitride semiconductor, while a part other than the light-transmissive region may be configured by another material. The first substrate 11 has a light incident surface (a surface opposite to a surface facing the second substrate 12) that is provided with an anti-reflection film, for example, and has a light output surface (the surface facing the second substrate 12) that is provided with a dichroic mirror. The anti-reflection film serves to allow light from the light source section 10E to be easily transmitted through the first substrate 11 to enter the fluorescent part 13L. Likewise, the dichroic mirror serves to allow the light from the light source section 10E to be easily transmitted through the first substrate 11 and to reflect the fluorescence Lf generated in the fluorescent part 13L toward the second substrate 12.

The second substrate 12 is configured, for example, by glass such as BK7. Sapphire, an oxide semiconductor such as InGaZnO, or a nitride semiconductor such as AlN may be used as the second substrate 12. Similarly to the first substrate 11, only a part of the light-transmissive region (the fluorescent part 13L) of the second substrate 12 may be configured by sapphire, glass, an oxide semiconductor, or a nitride semiconductor, while a part other than the light-transmissive region may be configured by another material. The second substrate 12 has surfaces (a surface facing the first substrate 11 and a light output surface) that are both provided with an anti-reflection film. The anti-reflection film serves to allow the fluorescence Lf generated in the fluorescent part 13L to be easily transmitted through the second substrate 12. One or both of the surfaces of the second substrate 12 may be provided with a fine structure or an optically functional film, for example. The fine structure refers to, for example, a photonic crystal, a microlens, or the like. The photonic crystal is one of optically functional devices configured by a nano-order periodic structure, and is able to control a light distribution state by a shape and a period, etc. of the periodic structure. The microlens is one of optically functional devices, in which micro-sized lenses of a micro-order or less are arranged in an array. The optically functional film is a reflection film, for example. Accordingly, it is possible to provide the second substrate 12 with a light distribution control function.

As illustrated in FIG. 6A, for example, the adhesive part 13A is provided near a circumference of each of the first substrate 11 and the second substrate 12 and near the central part of each thereof. The adhesive part 13A near the circumference is provided continuously to follow the circumference of each of the first substrate 11 and the second substrate 12. The adhesive part 13A near the center is provided in a ring-shape around the through-hole. The adhesive 14 serves to adhere and fix the first substrate 11 and the second substrate 12 together. The adhesive 14 is configured, for example, by a resin material such as a silicone adhesive and an epoxy adhesive. An inorganic adhesive such as glass or alumina may also be used as the adhesive 14.

FIG. 7 is an enlarged view of the fluorescent part 13L. In the present embodiment, the fluorescent part 13L is provided with a transparent grain 18 in addition to a phosphor 17. This makes it possible to freely adjust a ratio between the fluorescence Lf and the transmitted light Lt outputted from the fluorescent structure 10L, although the detail is described later.

The fluorescent part 13L is provided to fill a region between the adhesive part 13A near the circumference and the adhesive part 13A near the center. In other words, a region, between the first substrate 11 and the second substrate 12, other than the adhesive parts 13A corresponds to the fluorescent part 13L. The fluorescent part 13L has a thickness (a Z-direction in FIG. 7) of 30 μm to 80 μm, for example. The thickness of the fluorescent part 13L refers to a distance between the first substrate 11 and the second substrate 12, more particularly to a distance between respective surfaces, of the first substrate 11 and the second substrate 12, that face each other.

The phosphor 17 provided in the fluorescent part 13L is a particle that absorbs light emitted from the light source section 10E to generate fluorescence. The phosphor 17 is, for example, a particle that is excited by light in a blue wavelength region to emit yellow fluorescence. The phosphor 17 is configured, for example, by an inorganic phosphor, a semiconductor nano-particle, or the like. Examples of the inorganic phosphor that may be used include an yttrium-aluminum-garnet (YAG) material with a Ce-activating material being added thereto (Ce:YAG) and $La_3Si_6N_{11}$ (LSN) material with a Ce-activating material being added thereto (Ce:LSN). The phosphor 17 has a grain diameter of 10 μm to 30 μm, for example. The phosphor 17 is coupled neither to the first substrate 11 nor to the second substrate 12; a plurality of phosphors 17 are not coupled to one another, either.

A plurality of transparent grains 18 are provided in a dispersed manner in the fluorescent part 13L. The transparent grains 18 serve to adjust a volume of the phosphors 17 per unit volume in the fluorescent part 13L. For example, the larger the number of the transparent grains 18 becomes, or the larger a grain diameter of each of the transparent grains 18 becomes, the smaller the volume of the phosphors 17 per unit volume in the fluorescent part 13L becomes. As used herein, the term "transparent" refers to a property of transmitting the excitation light Le (including light in a visible region and light in a non-visible region) emitted from the light source section 10E and the fluorescence Lf. The transparent grain 18 has an aspherical shape, for example. The transparent grain 18 may have any other shape such as a rugby-ball shape, a cuboid shape, a cubic shape, a cylindrical shape, or a prism shape. The grain diameter of the transparent grain 18 is in a range from 10 μm to 30 μm, for example. It is preferable to use an inorganic material as the transparent grain 18 in terms of heat resistance. The transparent grain 18 is configured, for example, by any of glasses, sapphire, an oxide semiconductor such as InGaZnO, any of nitride semiconductors, or the like.

The motor 15 is provided along the rotation axis R, and rotationally drives the fluorescent structure 10L at a predetermined rotational frequency. The rotational driving performed by the motor 15 rotates, in an X-Y plane, the adhesive part 13A and the fluorescent part 13L, together with the first substrate 11 and the second substrate 12. The motor 15 is provided to penetrate the through-hole in the first substrate 11 and the second substrate 12 and to protrude partly from the second substrate 12. The fixing member 16 is provided to cover, in addition to the second substrate 12, the motor 15 protruding from the second substrate 12. The fixing member 16 is a pressing jig, and mechanically presses and fixes the motor 15 onto the second substrate 12. This allows the motor 15 to be fixed at a position of the rotation axis R.

Such a fluorescent structure 10L may be manufactured, for example, according to the following method.

First, the transparent grain 18 is mixed into the phosphor 17 in advance at a predetermined ratio. Next, the adhesive 14 is applied to the adhesive part 13A on the first substrate 11, and thereafter the second substrate 12 is superposed on the first substrate 11 to cure the adhesive 14 having been applied to the adhesive part 13A located outside. Thereafter, for example, the phosphor 17 and the transparent grain 18 having been mixed beforehand are injected into a part between the first substrate 11 and the second substrate 12 from the through-hole at the central part of each of the first substrate 11 and the second substrate 12, to form the fluorescent part 13L. As for the fluorescent part 13L, it is possible to perform a method similar to a method of liquid crystal injection; for example, the injection is possible using vacuum differential pressure or centrifugal force. The centrifugal force is generated by rotation of each of the first substrate 11 and the second substrate 12. After the formation of the fluorescent part 13L, the adhesive 14 having been applied inside is cured.

Thereafter, the motor 15 is inserted into the through-hole of the first substrate 11 and the second substrate 12 from side of the first substrate 11. Lastly, the motor 15 protruding from the second substrate 12 is pressed by the fixing member 16 to mechanically fix the motor 15. This allows for formation of the fluorescent structure 10L.

(Operation)

In the projection display apparatus 1, light emitted from the light source unit 10 is applied to the image forming section 30 by the illumination optical system 20. In the image forming section 30, red light, green light, and blue light are each subjected to spatial modulation, and thereafter are combined; the combined light enters the projection optical system 40. In the projection optical system 40, the light incident from the image forming section 30 is expanded to be projected onto a screen, etc., for example.

Among those described above, the operation of the light source unit 10 is described more specifically with reference to FIGS. 3 and 8. In the light source unit 10, first, the motor 15 is driven to rotationally drive the fluorescent structure 10L. The fluorescent structure 10L rotates at 3,600 rpm or more, for example.

Next, as illustrated in FIG. 2, for example, the excitation light Le in a blue wavelength region is emitted from the light source section 10E. The excitation light Le enters the fluorescent structure 10L via the condensing optical system 10F. The excitation light Le having entered the fluorescent structure 10L passes through the first substrate 11, and thereafter enters the fluorescent part 13L, as illustrated in FIG. 8.

In the fluorescent part 13L, the phosphor 17 absorbs a portion of the incident excitation light Le to perform conversion into the fluorescence Lf in a yellow wavelength region, for example. The fluorescence Lf passes through the second substrate 12 to enter the collimating optical system 10C. It is to be noted that most of the excitation light Le absorbed by the phosphor 17 is converted into the fluorescence Lf; however, some of the excitation light Le is converted into heat. That is, a vicinity of the fluorescent part 13L where the excitation light Le having entered generates heats. The rotational driving of the fluorescent structure 10L allows for dispersion of a region where the excitation light Le enters, thus making it possible to prevent generation of local heat. Hence, it becomes possible to prevent temperature quenching.

The excitation light Le having passed through the fluorescent part 13L without being absorbed by the phosphor 17 passes, as the transmitted light Lt, through the second substrate 12, together with the fluorescence Lf, to enter the collimating optical system 10C. For example, a portion of the excitation light Le having entered the transparent grain 18 becomes the transmitted light Lt. In this manner, the fluorescence Lf and the transmitted light Lt enter the illumination optical system 20 from the light source unit 10.

(Workings and Effects)

In the projection display apparatus 1 according to the present embodiment, the fluorescent part 13L of the fluorescent structure 10L is provided with the transparent grain 18, thus making it possible to adjust a volume fraction of the phosphors 17 per unit volume in the fluorescent part 13L as well as a layer thickness. Hence, it becomes possible to freely control a ratio between the fluorescence Lf and the transmitted light Lt outputted from the fluorescent structure 10L and thus to obtain light having a desired white point (color temperature) from the light source unit 10. This is described hereinafter.

FIG. 9 illustrates a cross-sectional configuration of a fluorescent structure 500L according to a comparative example. In the fluorescent structure 500L, the phosphor 17 is fixed to the first substrate 11 using a binder 514. The plurality of phosphors 17 are bound together by the binder 514. The binder 514 is configured by a resin material or an inorganic material. The motor 15 is fixed to the first substrate 11 by an adhesive 500. In the fluorescent structure 500L using such a binder 514, a thickness of a fluorescent part 513L is defined by a thickness of the binder 514. The thickness of the fluorescent part 513L and a concentration of the phosphor 17 in the florescent part 513L determine a ratio between fluorescence and transmitted light to be outputted from the fluorescent structure 500L. Because of difference in a desired white point depending on standards, it becomes necessary to adjust the ratio between the fluorescence and the transmitted light.

However, there is a possibility that the use of the binder 514 may lead to occurrence of the following issues, for example. First, there are narrower alternatives of a constituent material of the first substrate 11. The binder 514 and the first substrate 11 are in contact with each other. Accordingly, in order to prevent thermal stress fracture caused by a thermal expansion difference between the binder 514 and the first substrate 11, the constituent material of the first substrate 11 is limited to a constituent material having a value close to a linear expansion coefficient of a constituent material of the binder 514. Such an issue may also occur whether the binder 514 is configured by a resin material or an inorganic material.

Moreover, the binder 514 configured by a resin material has low light resistance, thus making reliability of the light source unit likely to be lowered. This issue becomes conspicuous, in particular, when increasing a light amount of the excitation light Le emitted from the light source section (e.g., the light source section 10E) in order to allow the light source unit to have higher luminance. In addition, the binder 514 configured by a resin material has lowered efficiency of light utilization, due to absorption of fluorescence or transmitted light performed by the binder 514.

Due to possible occurrence of such various issues caused by the use of the binder 514, it is desired to use a fluorescent structure that does not involve the use of the binder 514, i.e., the use of a binderless phosphor wheel. However, the binderless phosphor wheel makes it hardly possible to adjust a thickness of a fluorescent part (e.g., the fluorescent part 513L illustrated in FIG. 9) using a binder (e.g., the binder 514 illustrated in FIG. 9), thus making it difficult to control the ratio between the fluorescence and the transmitted light.

In contrast, although the fluorescent structure 10L according to the present embodiment is the binderless phosphor wheel, the fluorescent part 13L is provided with the transparent grain 18. Accordingly, varying a mixture ratio between the phosphor 17 and the transparent grain 18 allows for adjustment of a distance between adjacent phosphors 17. In other words, it becomes possible to adjust a volume fraction of the phosphors 17 per unit volume in the fluorescent part 13L as well as a layer thickness. Varying the grain diameter of the transparent grain 18 also makes it possible to adjust the volume fraction of the phosphors 17 per unit volume in the fluorescent part 13L as well as the layer thickness. In this manner, the amount, the grain diameter, etc. of the transparent grain 18 make it possible to freely control the ratio between the fluorescence Lf and the transmitted light Lt outputted from the fluorescent structure 10L and thus to obtain a desired white point from the light source unit 10.

FIG. 10 illustrates a variation in a ratio of an amount of the transmitted light Lt to an amount of the fluorescence Lf (transmitted light Lt/fluorescence Lf) at a time when the thickness of the fluorescent part 13L and a filling factor of the phosphors 17 in the fluorescent part 13L are varied. In this example, the filling factor of the phosphors 17 in the fluorescent part 13L represents the volume fraction of the phosphors 17 per unit space. When the mixture ratio of the transparent grains 18 relative to the phosphors 17 in the fluorescent part 13L is decreased, the filling factor of the phosphors 17 in the fluorescent part 13L becomes larger. When the mixture ratio of the transparent grains 18 relative to the phosphors 17 is increased, the filling factor of the phosphors 17 in the fluorescent part 13L becomes smaller.

In a case where the thickness of the fluorescent part 13L is constant, the larger the filling factor of the phosphors 17 in the fluorescent part 13L becomes, the smaller the ratio of the amount of the transmitted light Lt to the amount of the fluorescence Lf becomes. Further, in a case where the filling factor of the phosphors 17 in the fluorescent part 13L is constant, the larger the thickness of the fluorescent part 13L becomes, the smaller the ratio of the amount of the transmitted light Lt to the amount of the fluorescence Lf becomes. For example, in order to obtain a predetermined ratio of the amount of the transmitted light Lt to the amount of the fluorescence Lf, the thickness of the fluorescent part 13L may be smaller, while the filling factor of the phosphors 17 in the fluorescent part 13L may be larger; alternatively, the thickness of the fluorescent part 13L may be larger, while the filling factor of the phosphors 17 in the fluorescent part 13L may be smaller.

In this manner, for example, by adjusting the thickness of the fluorescent part 13L within a range from 30 μm to 80 μm, and by adjusting the filling factor of the phosphors 17 in the fluorescent part 13L within a range from 20 vol % to 60 vol %, it becomes possible to obtain a desired white point.

Moreover, the fluorescent structure 10L that is the binderless phosphor wheel allows for increased alternatives of the constituent material of each of the first substrate 11 and the second substrate 12. For example, the first substrate 11 and the second substrate 12 each having a high thermal conductivity may be selected in terms of heat dissipation. Alternatively, the first substrate 11 and the second substrate 12 each requiring less cost may be selected in terms of costs. Further, it is possible to enhance reliability as well as efficiency of light utilization, because of unnecessity of a resin material.

As described above, in the present embodiment, the fluorescent part 13L of the fluorescent structure 10L is provided with the transparent grain 18, in addition to the phosphor 17, thus making it possible to freely control the ratio between the fluorescence Lf and the transmitted light Lt outputted from the fluorescent structure 10L.

Moreover, the fluorescent structure 10L is the binderless phosphor wheel, thus making it possible to increase alternatives of the constituent material of each of the first substrate 11 and the second substrate 12. Further, it is possible to enhance reliability as well as efficiency of light utilization.

The projection display apparatus 1 provided with the light source unit 10 that includes such a fluorescent structure 10L is able to exhibit a superior display performance.

Next, description is given of modification examples of the foregoing embodiment and another embodiment. In the following, components similar to those of the foregoing embodiment are denoted with the same reference numerals, and the descriptions thereof are omitted where appropriate.

Modification Example 1

As illustrated in FIGS. 11 and 12, a surface of the transparent grain 18 or the phosphor 17 may be covered with an optically functional layer 19 (Modification Example 1). The optically functional layer 19 is, for example, an anti-reflection layer having a thickness of 1 μm or less, or a dichroic mirror layer having a thickness of 5 μm or less. The dichroic mirror layer has functions of transmitting and reflecting light having a specific wavelength. The surface of each of the transparent grain 18 and the phosphor 17 may be covered with the optically functional layer 19. The provision of such an optically functional layer 19 makes it possible to enhance efficiency of light utilization.

Second Embodiment

FIG. 13 illustrates a cross-sectional configuration of a fluorescent part 63L of a fluorescent structure (a fluorescent structure 60L) according to a second embodiment. The fluorescent part 63L of the fluorescent structure 60L is not provided with a transparent grain (the transparent grain 18 illustrated in FIG. 7), and the surface of the phosphor 17 is covered with a transparent coating layer 68. In other words, the fluorescent part 63L is provided with the transparent coating layer 68 instead of the transparent grain. The fluorescent structure 60L differs from the fluorescent structure 10L in this respect.

Similarly to the fluorescent part 13L, the fluorescent part 63L is provided between the first substrate 11 and the second substrate 12. For example, all the surfaces of the plurality of phosphors 17 provided in the fluorescent part 63L are covered with the transparent coating layer 68. The phosphor 17 having a surface covered with the transparent coating layer 68 and the phosphor 17 having an exposed surface may coexist mixedly in the fluorescent part 63L. The transparent coating layer 68 covers the entire surface of each of the phosphors 17. There may exist the phosphor 17 with a portion of the surface exposed from the transparent coating layer 68, due to manufacturing tolerance, etc. The transparent coating layer 68 is preferably configured by an inorganic material. The transparent coating layer 68 is configured, for example, by any of glasses, sapphire, an oxide semiconductor such as InGaZnO, a nitride semiconductor, or the like. The transparent coating layer 68 has a thickness of 10 nm to 10,000 nm, for example.

In the present embodiment, covering the surface of the phosphor 17 with such a transparent coating layer 68 allows for adjustment of a distance between adjacent phosphors 17. In other words, it becomes possible to adjust volume fraction of the phosphors 17 per unit volume in the fluorescent part 63L. For example, increasing the thickness of the transparent coating layer 68 decreases the volume fraction of the phosphors 17 per unit volume in the fluorescent part 63L. Decreasing the thickness of the transparent coating layer 68 increases the volume fraction of the phosphors 17 per unit volume in the fluorescent part 63L.

In this manner, the fluorescent structure 60L, similarly to the fluorescent structure 10L, makes it possible to freely control the ratio between the fluorescence Lf and the transmitted light Lt outputted from the fluorescent structure 60L.

Modification Example 2

As illustrated in FIG. 14, the transparent coating layer 68 may be further covered with the optically functional layer 19 (Modification Example 2). The optically functional layer 19 is, for example, an anti-reflection layer having a thickness of 1 μm or less, or a dichroic mirror layer having a thickness of 5 μm or less. The provision of such an optically functional layer 19 makes it possible to enhance efficiency of light utilization.

Modification Example 3

FIG. 15 is a schematic view of an overall configuration of a projection display apparatus (a projection display apparatus 1A) according to Modification Example 3. The light source unit 10 including the fluorescent structure 10L according to the first embodiment or the fluorescent structure 60L according to the second embodiment may be applied to the projection display apparatus 1A.

Similarly to the projection display apparatus 1, the projection display apparatus 1A includes the light source unit 10, the illumination optical system 20, the image forming section 30, and the projection optical system 40.

The illumination optical system 20 includes, for example, from a position close to the light source unit 10, fly's eye lenses 21 (21A and 21B), a polarization conversion element 22, a lens 23, color separation elements 24A and 24B, optical path conversion elements 25A and 25B, lenses 26A and 26B, a color separation element 27, and polarizing plates 28A to 28C. The color separation elements 24A, 24B, and 27 are each configured, for example, by a dichroic mirror. The optical path conversion elements 25A and 25B are each configured, for example, by a mirror.

The fly's eye lenses 21 (21A and 21B) are directed to uniformizing illuminance distribution of white light from the collimating optical system 10C of the light source unit 10. The polarization conversion element 22 functions to align a polarization axis of incident light in a predetermined direction. For example, the polarization conversion element 22 converts light other than P-polarized light into P-polarized light. The lens 23 condenses light from the polarization conversion element 22 toward the color separation elements 24A and 24B. The color separation elements 24A and 24B each selectively reflect light in a predetermined wavelength region, and selectively transmit light in other wavelength regions. For example, the color separation element 24A mainly reflects the red light Lr in a direction of the optical path conversion element 25A. Further, the color separation element 24B mainly reflects the blue light Lb in a direction of the optical path conversion element 25B. Accordingly, the green light Lg mainly passes through both of the color separation elements 24A and 24B, and travels toward a reflective polarizing plate 31C (described later) of the image forming section 30. The optical path conversion element 25A reflects the light (mainly the red light Lr) from the color separation element 24A toward the lens 26A, and the optical path conversion element 25B reflects the light (mainly the blue light Lb) from the color separation element 24B toward the lens 26B. The lens 26A transmits the light (mainly the red light Lr) from the optical path conversion element 25A to condense the transmitted light to the color separation element 27. The lens 26B transmits the light (mainly the blue light Lb) from the optical path conversion element 25B to condense the transmitted light to the color separation element 27. The color separation element 27 selectively reflects the green light Lg, and selectively transmits light in other wavelength regions. In this example, a red light Lr component of the light from the transmitting lens 26A is transmitted. In a case where a green light Lg component is included in the light from the transmitting lens 26A, the green light Lg component is reflected toward the polarizing plate 28C. The polarizing plates 28A to 28C each include a polarizer having a polarizing axis in a predetermined direction. For example, in a case where the polarization conversion element 22 performs conversion into P-polarized light, the polarizing plates 28A to 28C each transmit light of the P-polarized light and reflect light of S-polarized light.

The image forming section 30 includes reflective polarizing plates 31A to 31C, light modulation elements 32A to 32C, and a color combining element 33.

The reflective polarizing plates 31A to 31C transmit light beams (e.g., P-polarized light) having polarization axes the same as the polarization axes of polarized light beams from the polarizing plates 28A to 28C, respectively, and reflect light beams (S-polarized light) having other polarization axes. Specifically, the reflective polarizing plate 31A transmits the red light Lr of the P-polarized light from the polarizing plate 28A in a direction of the light modulation element 32A. The reflective polarizing plate 31B transmits the blue light Lb of the P-polarized light from the polarizing plate 28B in a direction of the light modulation element 32B. The reflective polarizing plate 31C transmits the green light Lg of the P-polarized light from the polarizing plate 28C in a direction of the light modulation element 32C. The green light Lg of the P-polarized light having been transmitted through both of the color separation elements 24A and 24B and having entered the reflective polarizing plate 31C is transmitted through the reflective polarizing plate 31C as it is to enter the color combining element 33. Further, the reflective polarizing plate 31A reflects the red light Lr of the S-polarized light from the light modulation element 32A to cause the reflected red light Lr to enter the color combining element 33. The reflective polarizing plate 31B reflects the blue light Lb of the S-polarized light from the light modulation element 32B to cause the reflected blue light Lb to enter the color combining element 33. The reflective polarizing plate 31C reflects the green light Lg of the S-polarized light from the light modulation element 32C to cause the reflected green light Lg to enter the color combining element 33.

The light modulation elements 32A to 32C performs spatial modulation of the red light Lr, the blue light Lb, and the green light Lg, respectively. The light modulation elements 32A to 32C are each configured, for example, by a reflective liquid crystal panel. The light modulation elements 32A to 32C may be each configured by a transmissive liquid crystal panel or an MEMS mirror panel.

The color combining element 33 combines incident red light, incident blue light, and incident green light to output the combined light toward the projection optical system 40. The color combining element 33 is configured, for example, by a dichroic prism.

The projection optical system 40 includes lenses L41 to L45 and an optical path conversion element M40. The projection optical system 40 expands light outputted from the image forming section 30 to project the expanded light onto a screen (unillustrated), etc. The optical path conversion element M40 is configured, for example, by a mirror.

It is possible for each of the fluorescent structures 10L and 60L to adjust the ratio between the fluorescence Lf and the transmitted light Lt and thus to obtain a desired white point. Hence, similarly to the projection display apparatus 1, the projection display apparatus 1A provided with the light source unit 10 that includes any of the fluorescent structures 10L and 60L exhibits a superior display performance.

Application Example

The description has been given, in the foregoing embodiments and modification examples, by exemplifying the projection display apparatuses to which the light source unit according to an embodiment of the present technology is applied. However, the light source unit according to an embodiment of the present technology is applicable, for example, to a headlamp (headlight) for automobiles, lighting, or the like.

FIG. 16 illustrates an appearance of a lighting apparatus to which the above-described light source unit 10 is applied. The lighting apparatus is a desktop lighting apparatus including the light source unit 10 according to the foregoing embodiments, etc. For example, the lighting apparatus includes a lighting section 843 that is attached to a supporting post 842 provided on a base mount 841. The lighting section 843 is configured by the light source unit 10 according to the foregoing embodiments. The lighting section 843 may take any form, such as a cylindrical shape illustrated in FIG. 16 or a curved shape illustrated in FIG. 17.

The light source unit 10 may be applied to an indoor lighting apparatus as illustrated in FIG. 18. The lighting apparatus includes lighting sections 844 each of which is configured by the above-described light source unit 10. The appropriate number of the lighting sections 844 are disposed at an appropriate interval on a ceiling 850A of a building. It is to be noted that installation locations of the lighting sections 844 are not limited to the ceiling 850A, but the lighting sections 844 may be installed at any location such as a wall 850B or a floor (unillustrated) depending on the intended use.

These lighting apparatuses perform lighting using light from the light source unit 10. Here, as described in the foregoing embodiments, the provision of the light source unit 10 that is able to control the ratio between the fluorescence Lf and the transmitted light Lt makes it possible to obtain light of a desired light emission color.

Although the present technology has been described hereinabove with reference to the embodiments and the modification examples, the present technology is not limited to the foregoing embodiments, etc., and may be modified in a variety of ways. For example, each of the components of the optical systems (light source unit, illumination optical system, image forming section, and projection optical system) exemplified in the foregoing embodiments, the arrangement thereof, the number thereof, and the like are mere examples. All of the components may not necessarily be provided, or another component may be further provided. For example, the projection display apparatus including a three-panel light modulation element has been described in the foregoing embodiments, etc. However, the present technology is also applicable to a projection display apparatus including a single-panel light modulation element (a light modulation element that performs temporal light modulation).

Although the description has been given, in the foregoing embodiments, etc., of the case where excitation light in a blue wavelength region is emitted from the light source section 10E and fluorescence in a yellow wavelength region and transmitted light in a blue wavelength region are combined to be emitted from each of the fluorescent structures 10L and 60L, the present technology is not limited thereto.

Further, although the description has been given, in the foregoing embodiments, etc., by exemplifying the case where the fluorescent structure is a circular rotator, the present technology is also applicable to a fluorescent structure that is a chip-shaped non-rotator, for example.

In addition, although the description has been given, in the foregoing embodiments, etc., of each of the case where the transparent grain 18 is provided and the case where the transparent coating layer 68 is provided, the fluorescent part may be provided with both of the transparent grain 18 and the transparent coating layer 68.

It is to be noted that the effects described in the present specification are merely exemplified and are not limited thereto, and may further include any other effects.

It is to be noted that the present technology may also have the following configurations.

(1)
A light source unit including:
a light source section; and
a fluorescent structure including a fluorescent part where light from the light source section enters,
the fluorescent part including a plurality of phosphors each having a surface that is covered with a transparent coating layer.

(2)
The light source unit according to (1), further including an optically functional layer that covers the transparent coating layer.

(3)
The light source unit according to (1) or (2), in which the transparent coating layer is configured by an inorganic material.

(4)
A light source unit including:
a light source section; and
a fluorescent structure including a fluorescent part where light from the light source section enters,
the fluorescent part including a transparent grain in addition to a plurality of phosphors.

(5)
The light source unit according to (4), including an optically functional layer that covers the phosphors or the transparent grain.

(6)
The light source unit according to (4) or (5), in which the transparent grain is configured by an inorganic material.

(7)
The light source unit according to any one of (1) to (6), in which the fluorescent structure includes a pair of substrates that face each other with the fluorescent part being interposed therebetween.

(8)
The light source unit according to (7), in which the phosphors are not coupled to the pair of substrates.

(9)
The light source unit according to (7) or (8), in which an adhesive part is provided, in addition to the fluorescent part, between the pair of substrates.

(10)
The light source unit according to any one of (1) to (9), in which the phosphors are not coupled to one another.

(11)
The light source unit according to any one of (1) to (10), in which the fluorescent structure includes a rotator.

(12)
A projection display apparatus including:
a light source unit;
an image forming section that forms an image using light from the light source unit; and
a projection optical system that projects light from the image forming section,
the light source unit including
a light source section, and
a fluorescent structure including a fluorescent part where light from the light source section enters,
the fluorescent part including a plurality of phosphors each having a surface that is covered with a transparent coating layer.

(13)
A projection display apparatus including:
a light source unit;
an image forming section that forms an image using light from the light source unit; and
a projection optical system that projects light from the image forming section,
the light source unit including
a light source section, and
a fluorescent structure including a fluorescent part where light from the light source section enters,
the fluorescent part including a transparent grain in addition to a plurality of phosphors.

This application claims the benefit of Japanese Priority Patent Application JP2016-182740 filed with the Japan Patent Office on Sep. 20, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A light source unit comprising:
a light source section; and
a fluorescent structure including a fluorescent part where light from the light source section enters,
the fluorescent part including a plurality of phosphors each having a surface that is covered with a transparent coating layer,
wherein the fluorescent structure includes:
a first substrate;
a second substrate; and
a first adhesive part and a second adhesive part that adhere the first substrate to the second substrate, wherein the fluorescent part is between the first adhesive part and the second adhesive part,
wherein the first substrate and the second substrate each include an opening to accommodate a motor, and
wherein the phosphors are not coupled to the first and second substrates.

2. The light source unit according to claim 1, further comprising an optically functional layer that covers the transparent coating layer.

3. The light source unit according to claim 1, wherein the transparent coating layer includes an inorganic material.

4. A light source unit comprising:
a light source section; and
a fluorescent structure including a fluorescent part where light from the light source section enters,
the fluorescent part including a transparent grain in addition to a plurality of phosphors,
wherein the fluorescent structure includes:
a first substrate;
a second substrate; and
a first adhesive part and a second adhesive part that adhere the first substrate to the second substrate, wherein the fluorescent part is between the first adhesive part and the second adhesive part,
wherein the first substrate and the second substrate each include an opening to accommodate a motor, and
wherein the phosphors are not coupled to the first and second substrates.

5. The light source unit according to claim 4, further comprising an optically functional layer that covers the plurality of phosphors or the transparent grain.

6. The light source unit according to claim 4, wherein the transparent grain includes an inorganic material.

7. The light source unit according to claim 1, wherein the first adhesive part and the second adhesive part are ring shaped.

8. The light source unit according to claim 1, wherein the fluorescent structure rotates comprises a rotator.

9. A projection display apparatus comprising:
a light source unit;
an image forming section that forms an image using light from the light source unit; and
a projection optical system that projects light from the image forming section,
the light source unit including:
a light source section; and
a fluorescent structure including a fluorescent part where light from the light source section enters,
the fluorescent part including a plurality of phosphors each having a surface that is covered with a transparent coating layer,
wherein the fluorescent structure includes:
a first substrate;
a second substrate; and
a first adhesive part and a second adhesive part that adhere the first substrate to the second substrate, wherein the fluorescent part is between the first adhesive part and the second adhesive part,
wherein the first substrate and the second substrate each include an opening to accommodate a motor, and
wherein the phosphors are not coupled to the first and second substrates.

10. A projection display apparatus comprising:
a light source unit;
an image forming section that forms an image using light from the light source unit; and
a projection optical system that projects light from the image forming section,
the light source unit including:
a light source section; and
a fluorescent structure including a fluorescent part where light from the light source section enters,
the fluorescent part including a transparent grain in addition to a plurality of phosphors,
wherein the fluorescent structure includes:
a first substrate;
a second substrate; and
a first adhesive part and a second adhesive part that adhere the first substrate to the second substrate, wherein the fluorescent part is between the first adhesive part and the second adhesive part,
wherein the first substrate and the second substrate each include an opening to accommodate a motor, and
wherein the phosphors are not coupled to the first and second substrates.

11. The light source unit according to claim 1, wherein the first adhesive part and the second adhesive part include a resin material.

12. The light source unit according to claim 4, wherein the first adhesive part and the second adhesive part include a resin material.

13. The projection display apparatus according to claim 9, wherein the first adhesive part and the second adhesive part include a resin material.

14. The projection display apparatus according to claim 10, wherein the first adhesive part and the second adhesive part include a resin material.

15. The light source unit according to claim 4, wherein the first adhesive part and the second adhesive part are ring shaped.

16. The projection display apparatus according to claim 9, wherein the first adhesive part and the second adhesive part are ring shaped.

17. The projection display apparatus according to claim 10, wherein the first adhesive part and the second adhesive part are ring shaped.

* * * * *